Figure 1:
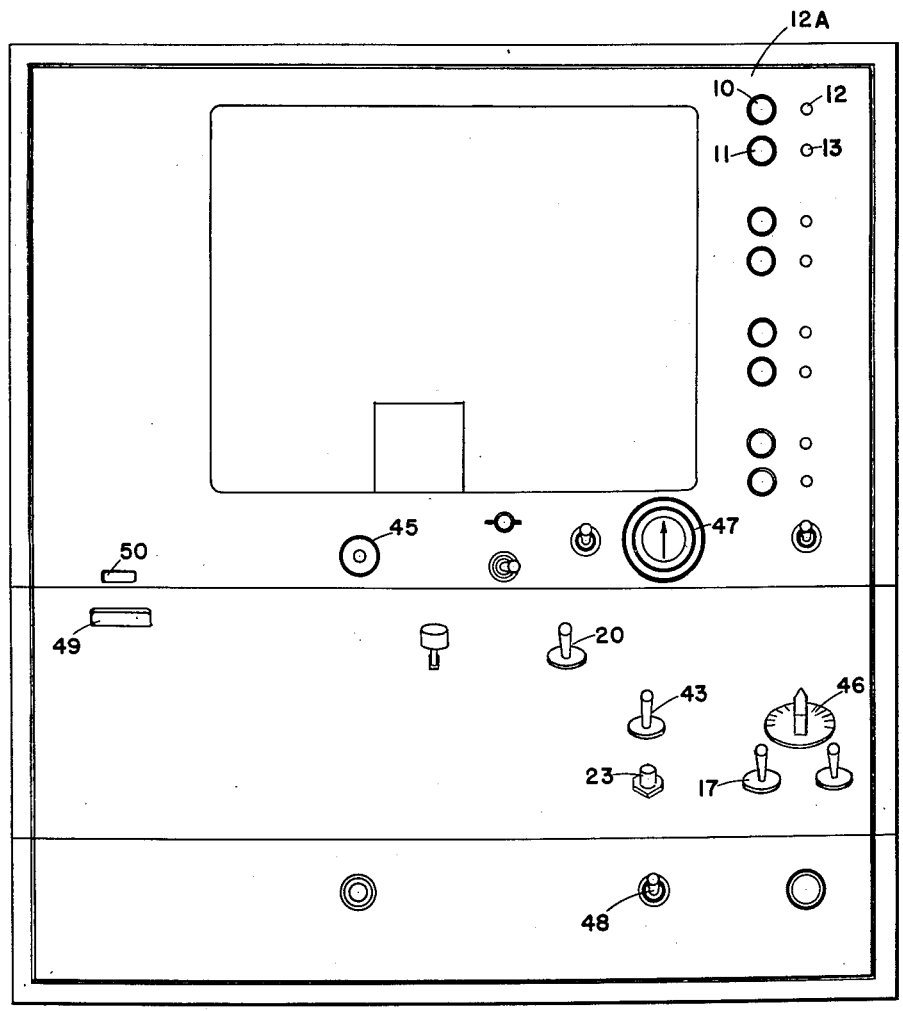

April 8, 1952 A. F. FAIRBANKS 2,592,018
FUNCTION PRINTER

Filed July 13, 1950 6 Sheets-Sheet 1

INVENTOR.
AVARD F. FAIRBANKS
BY
William R. Lane
ATTORNEY

April 8, 1952   A. F. FAIRBANKS   2,592,018
FUNCTION PRINTER

Filed July 13, 1950   6 Sheets-Sheet 2

*INVENTOR.*
AVARD F. FAIRBANKS
BY
*William R. Lane*
ATTORNEY

INVENTOR.
AVARD F. FAIRBANKS
BY
William R. Lane
ATTORNEY

April 8, 1952 A. F. FAIRBANKS 2,592,018
FUNCTION PRINTER

Filed July 13, 1950 6 Sheets-Sheet 4

INVENTOR.
AVARD F. FAIRBANKS
BY
*William L. Lane*
ATTORNEY

April 8, 1952     A. F. FAIRBANKS     2,592,018
FUNCTION PRINTER
Filed July 13, 1950     6 Sheets-Sheet 5
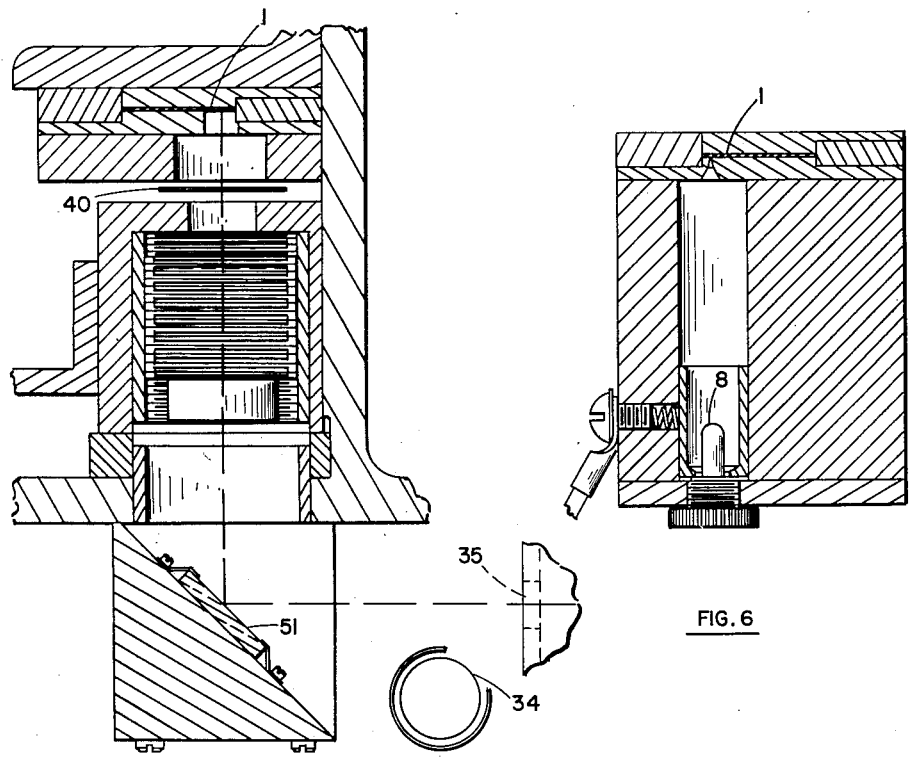
FIG. 5
FIG. 6
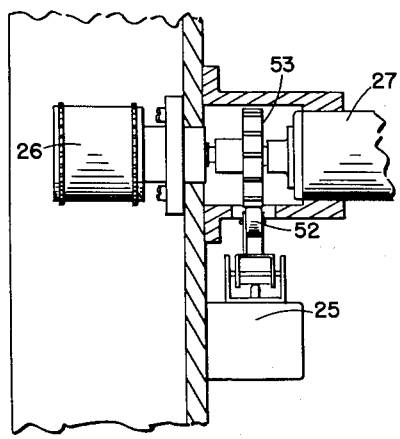
FIG. 7
INVENTOR.
AVARD F. FAIRBANKS
BY
ATTORNEY April 8, 1952  A. F. FAIRBANKS  2,592,018
FUNCTION PRINTER Filed July 13, 1950  6 Sheets-Sheet 6

*INVENTOR.*
AVARD F. FAIRBANKS
BY
ATTORNEY

Patented Apr. 8, 1952

2,592,018

UNITED STATES PATENT OFFICE 2,592,018

FUNCTION PRINTER

Avard F. Fairbanks, Garvey, Calif., assignor to
North American Aviation, Inc.

Application July 13, 1950, Serial No. 173,604

7 Claims. (Cl. 346—107)

This invention pertains to the recording of any predetermined algebraic or trigonometric function in pulse form upon a film where the independent variable is the velocity of the film. It particularly pertains to a device for recording upon a film a series of signals which when read back can be accurately transformed into trigonometric functions of the film travel. The problem toward which this invention is directed is that of placing upon a film a record which, when the film is read back at a variable rate of speed, will yield information which can be conveniently transformed into a shaft rotation precisely proportional to a trigonometric function, or, indeed, any desired function of the rate at which the film is fed through the reading-back mechanism. Reference is here made to co-pending application Serial No. 175,407 filed July 22, 1950, in the name of George M. Salamonovich, entitled "Function Generator," which is the complement of this invention.

It is an object of this invention to provide a mechanism for recording upon a continuous photographic film a series of step functions which when read back yield a shaft rotation which is an exact predetermined function of the velocity of the film.

It is another object of this invention to provide apparatus for the recording upon film of alternate transparent and opaque strips at predetermined times and intervals.

It is another object of this invention to provide a mechanism for recording on film predetermined light and dark strip patterns in coordination with a film drive mechanism.

It is a further object of this invention to provide a device for recording simultaneously two parallel chronological narratives in pulse form.

It is a further object of this invention to provide a device for converting tabular data into a pair of alternate transparent and opaque strips on a continuous film.

It is a further object of this invention to provide a device for making a continuous film record from a series of tabular quantities.

It is another object of this invention to provide means for recording accurately on film in the form of alternate opaque and transparent strips any predetermined trigonometric or algebraic function from a tabulated series of sample values of that function. By "predetermined trigonometric or algebraic function" is meant 'the trigonometric or algebraic expression relating one variable to another.

Figure 2:
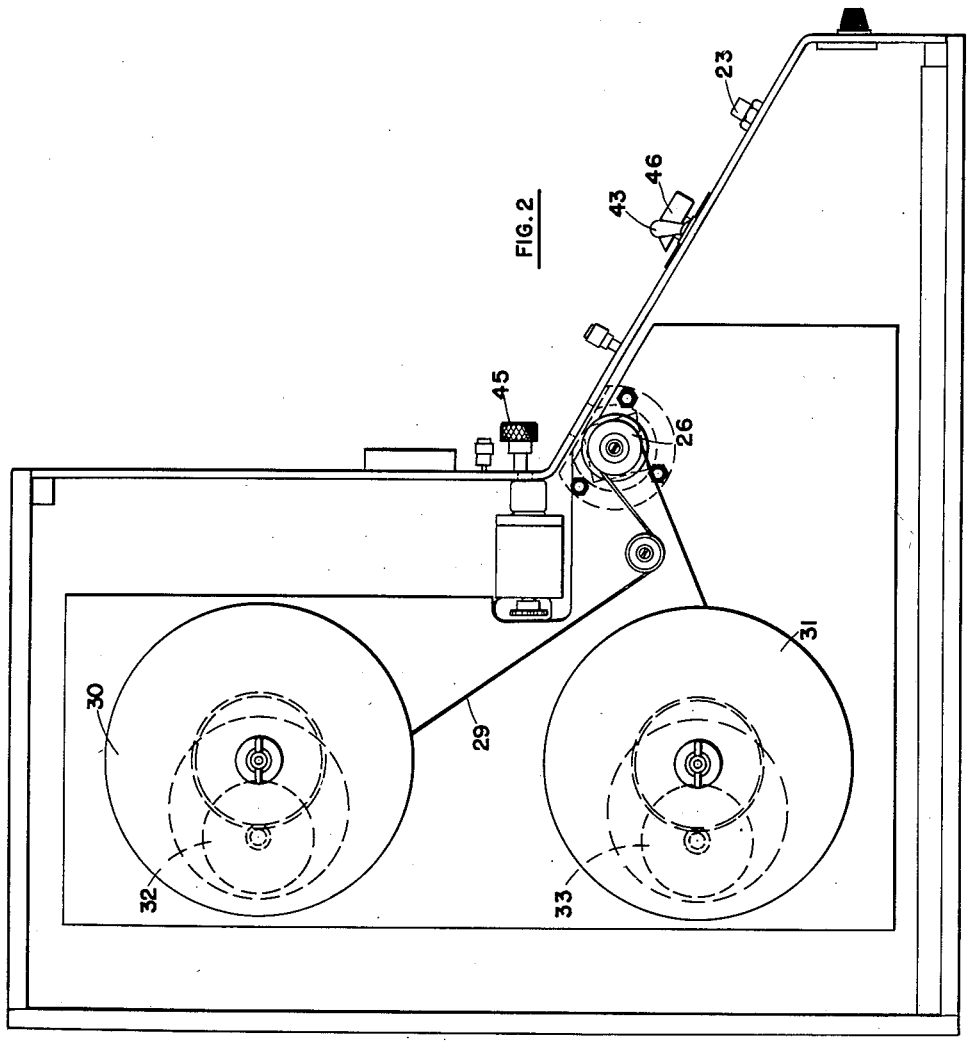
Figure 3:
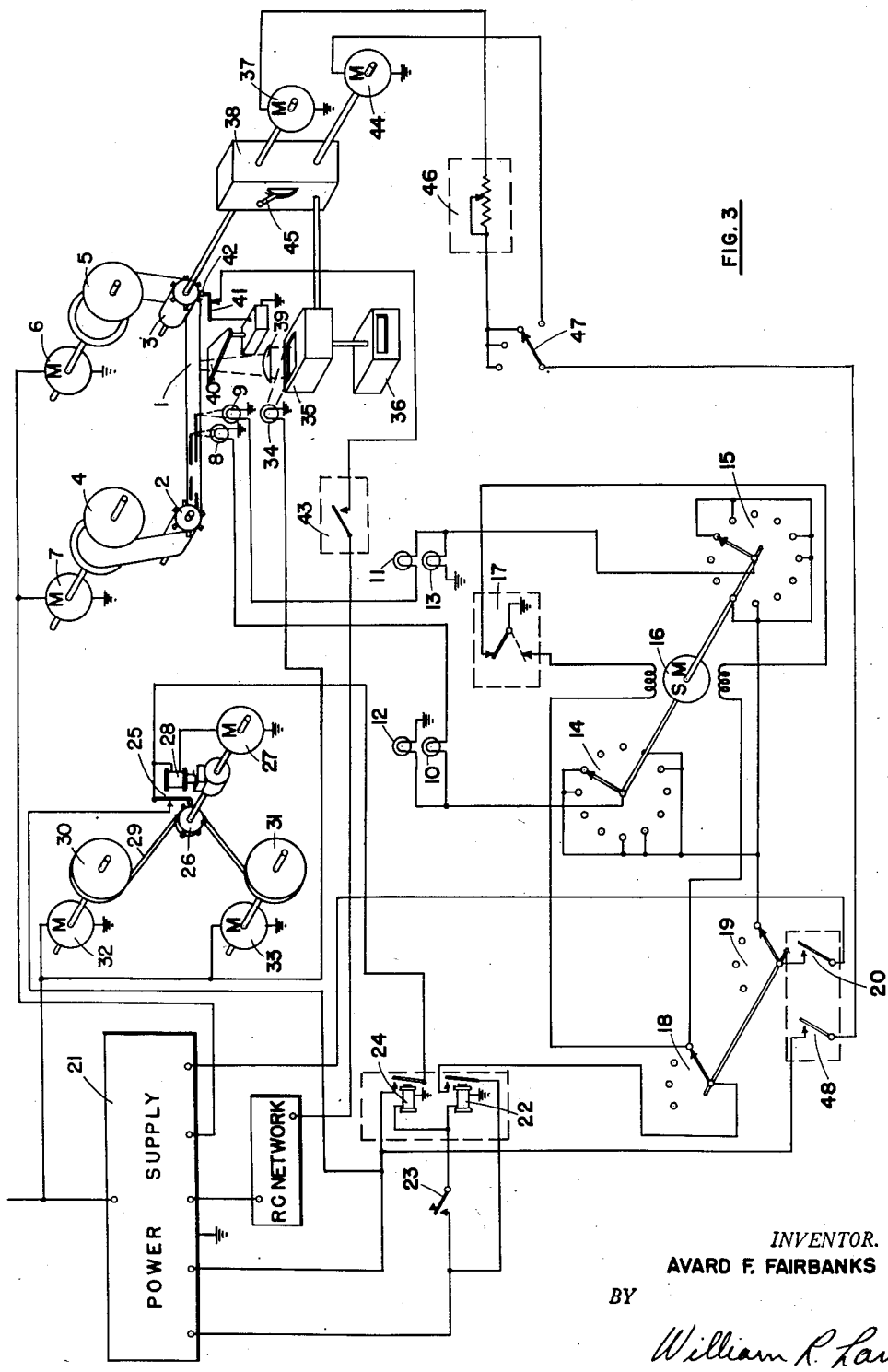
Figure 4:
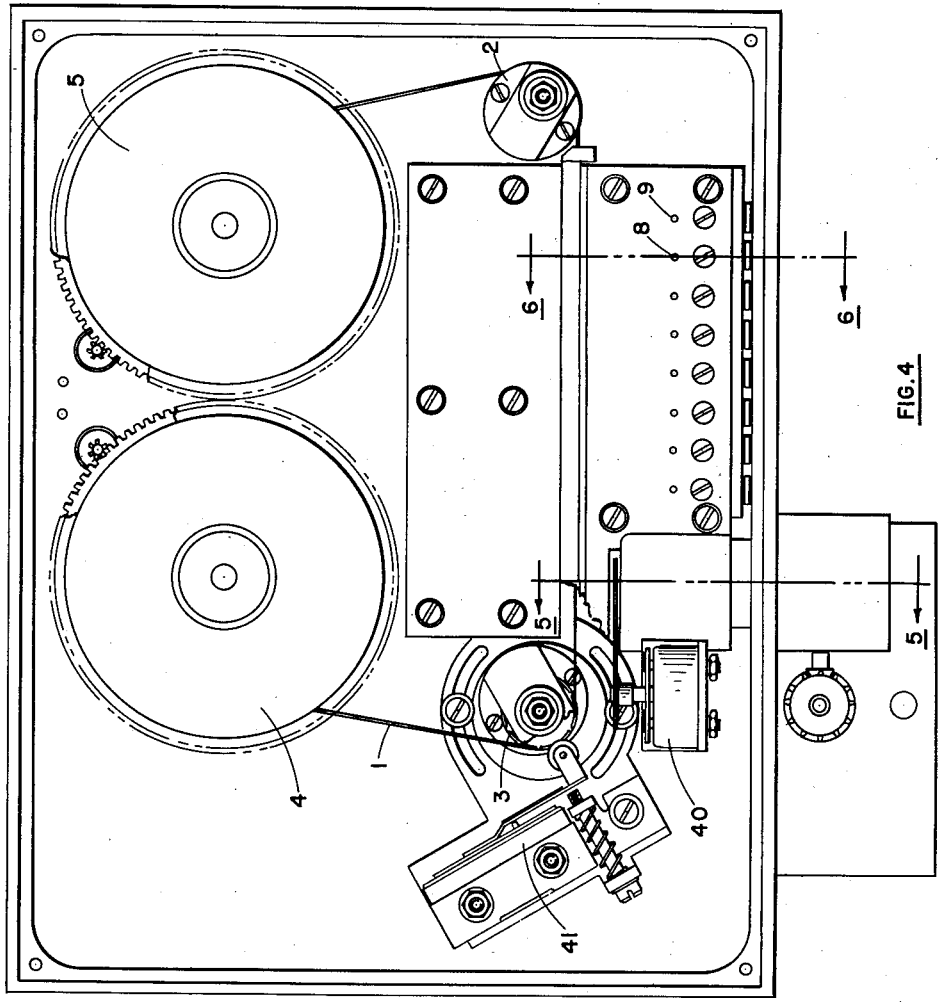
Figure 8:
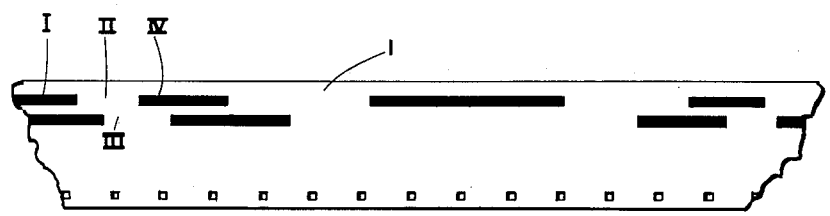
Figure 9:
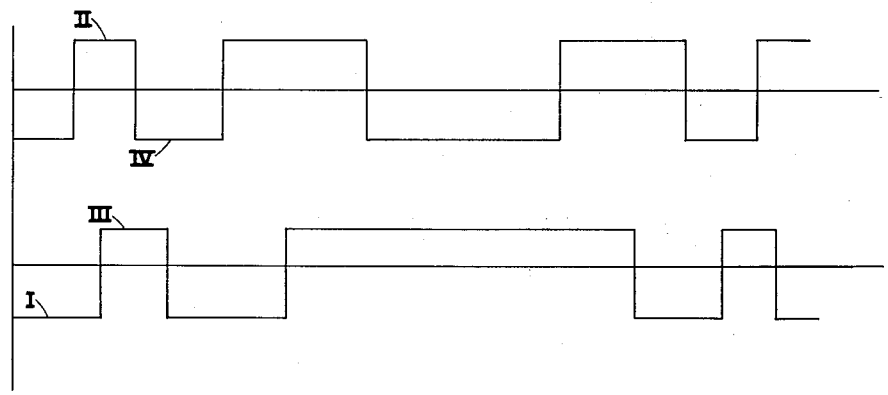
Figure 10:
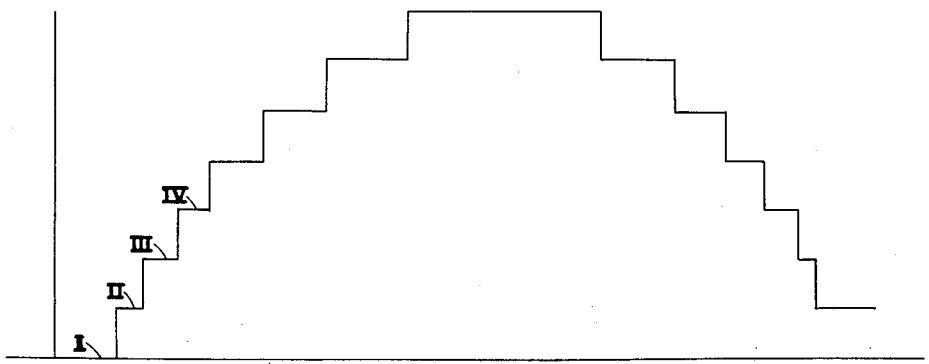

Other objects of invention will become apparent from the following description taken in connection with the accompanying drawings, in which Fig. 1 is an elevational view of the invention;
Fig. 2 is a side view of the invention partially cut away;
Fig. 3 is a schematic diagram of the invention;
Fig. 4 is a detailed view of the film-recording mechanism of the invention;
Fig. 5 is a sectional view of the invention taken at 5—5 in Fig. 4;
Fig. 6 is a sectional view of the invention taken at 6—6 in Fig. 4;
Fig. 7 is a detailed view of a tape-drive sprocket and microswitch cam of this invention;
Fig. 8 is a strip of film recorded by the device of this invention;
Fig. 9 is a rectangular plot of the record of Fig. 8 against time; and
Fig. 10 represents the integral of the information shown in Fig. 9.

Referring now to Fig. 3, a film 1 is shown driven on sprockets 2 and 3 by means of reels 4 and 5 and drive motors 6 and 7. Lamps 8 and 9, when lighted, provide light for recording strips on the moving film. Lamps 8 and 9 are in series with lamps 10 and 11 which appear on control panel 12A, as shown in Fig. 1. These are safety lamps to indicate to the operator of the device that lamps 8 and 9 concealed within the apparatus are in working order. Lamps 12 and 13 are also fed from the same source of power as are lamps 8, 9, 10 and 11 and are used to set up the initial exposure conditions when lamps 8, 9, 10, and 11 are turned off. Power to these lamps comes through selector switches 14 and 15 which are actuated by reversing step motor 16 which, in turn, is energized through recording sequence switch 17 by power transmitted through channel selector switch 18 on a common shaft with channel selector switch 19 which furnishes power to the lamps from on-off switch 20 connected to power supply 21. Power controlled by channel selector switch 18 is obtained from relay 22 energized by hand key 23. Hand key 23 also energizes relay 24 which furnishes power to microswitch 25 actuated by sprocket 26 which, in turn, is driven by tape drive motor 27 which with electromagnetic brake 28 is controlled by power transmitted by microswitch 25. Sprocket 26 drives tape 29 carried on reels 30 and 31 and held in tension by tape tension take-up motors 32 and 33 in turn energized from power supply 21.

Also energized from power supply 21 is lamp 34 used to illuminate counter 35 which, in turn, is geared to counter 36, both driven by motor 37 which, via gear box and clutch mechanism 38 drives sprocket 2 which moves film 1. Illumination from lamp 34 falls on the face of counter 35 and is transmitted through lens 39 via shutter 40 to the film. Shutter 40 is of the rotary solenoid type and is actuated by electricity conducted through microswitch 41 which closes when cam follower 42 rises to pass a tooth of sprocket 3. Shutter lock switch 43 is provided so that shutter 40 may positively be prevented from opening under certain operating or nonoperating conditions. Motor 44 may be engaged to drive counters 35 and 36 by movement of lever 45 on clutch and gear box 38 for the purpose of rapidly changing the counter dial readings without affecting the operation of the film drive mechanism proper. The speed of film drive motor 37 is controlled by film speed control 46; and selector switch 47 is provided for switching from motor 37 to motor 44 for resetting the dials of counters 35 and 36. On-off switch 48 is provided between switch 47 and power supply 21.

Control panel 12A is shown in Fig. 1, with hand key 23 and the indicator lamps corresponding to lamps 10, 11, 12 and 13 for eight channels. For convenience and simplicity of explanation, Fig. 3 has been restricted to but two channels, it being understood that the remaining switch positions on the various selector switches would be used to control additional lamps and film channels similar to lamps 8 and 9 whose indicator lamps are 10, 11, 12 and 13. Fig. 1 also shows the arrangement of the various switches and control levers which must be operated by the operator, as well as aperture 49 through which the operator views data presented on tape 29, and aperture 50 through which the operator views the counter reading of counter 36.

Fig. 2 shows in detail, tape 29, together with reels 30 and 31 and take-up motors 32 and 33. Sprocket 26 and clutch lever 45 are also shown in Fig. 2.

A detailed arrangement of film reels 4 and 5 and sprockets 2 and 3, together with microswitch 41 and rotary solenoid shutter 40, are shown in Fig. 4. Lamps 8 and 9 may be seen through small holes as indicated in Fig. 4.

Fig. 5 shows in detail how light from the face of counter 35 is transmitted via mirror 51 to the surface of film 1 whenever shutter 40 is not in interfering position.

Fig. 6 shows film 1 in connection with lamp 8 whose illumination causes recording of a strip record on the film.

Tape sprocket 26 is shown in detail in Fig. 7, together with microswitch 25 which makes contact whenever cam follower 52 is actuated by cam 53 driven by motor 27.

In Fig. 8 there is shown a sample of the recording which may be done by this device; and in Figs. 9 and 10 are shown plotted against time, the records shown in Fig. 8 and their integral, respectively. In order to achieve the recording shown in Fig. 8 it is necessary that lamps 8 and 9 be turned on and off at the proper times and for the proper lengths of time. To achieve this in a way which will minimize the effect of human error of the operator, eliminate as far as possible fatigue on the part of the operator, and assure a uniform and dependable record for relatively great lengths of film requires the operation and coordination of all the apparatus shown schematically in Fig. 3. In order to reduce human error in the operator it is essential that the operations he performs be as simple as possible. Any reduction in the number of choices presented to the human mind reduces proportionately the number of errors which can possibly be made thereby. This invention is so devised that once proper semipermanent settings are made the only operation performed by the operator is that of depressing a single key. The operator need not even know when or how often to depress the key because this invention gives him that information currently.

Tape 29 carries on it in tabulated form, counter readings of successive points on the film where key 23 must be depressed in order to make the proper record. These counter readings correspond to numbers of frames passing lamps 8 and 9, and are duly measured and recorded on film 1 by counters 35 and 36, the image of counter 35 being impressed upon film 1 at intervals determined by the actuation of shutter 40. Tabular data on tape 29 gives the reading the counter should have for equal increments in the function to be printed. For example, if the function to be printed is to be sin $x$, then a table giving arc sin $x$ is gone over manually, and the values of $x$ with the desired increment of arc sin $x$ are written down on tape 29 as it is stepped through the machine. Such a set of values may obviously be obtained from a standard trigonometric table.

Referring momentarily to Fig. 1, the operator observes tape 29 through aperture 49 in the face of control panel 12A. He also observes counter 36 through aperture 50. When the number on tape 29 equals the number on counter 36 the operator depresses key 23, thereby setting in motion the following sequence of events: Closing of key 23 energizes relays 22 and 24. Relay 24 conducts electricity to brake 28 and motor 27. Solenoid brake 28 is so devised that when the solenoid and motor are energized the brake is released, thus allowing motor 27 and sprocket 26 to turn. When sprocket 26 turns, microswitch 25 closes, and continues to energize motor 27 and the solenoid of brake 28 until sprocket 26 rotates far enough to again open microswitch 25. When microswitch 25 opens, motor 27 stops and the brake shoe is allowed to again contact the shaft of sprocket 26 and thereby stop its angular motion. The resultant motion, however, has caused tape 29 to progress one space, thereby bringing to the view of the operator, through aperture 49, the next counter reading at which key 23 must be depressed. All this time, it will be observed from Fig. 3, motors 6, 7 and 37 have been energized and have been driving film 1 at a uniform slow rate through the recording mechanism.

Returning now to key 23, the flow of current through key 23 also causes the closing of relay 22 which in turn communicates electricity to selector switch 19 and thence to reversing step motor 16. Key 23 need only be depressed momentarily, yet it may be held down till just before it next needs to be depressed. Thus the circuit has been so designed that it operates independently of the operator's "touch." Switches 14 and 15 driven by step motor 16 control the flow of current to lamps 8 and 9, causing film 1 to be exposed on narrow strips thereof.

Meanwhile, shutter 40 is being actuated every time microswitch 41 is closed due to rotation of sprocket 3. The image of counter 35 is therefore focused on the film and forms a convenient index which by interpolation will show what the counter reading was at the instant each strip was recorded.

To explain in further detail the operation of lamps 8 and 9 and of switches 14 and 15 let us consider for a moment the different possible recording combinations which may occur when key 23 is depressed. These combinations are four in number: first, both lamps 8 and 9 may be turned on, thus recording two exposed strips on film 1; second, both lamps 8 and 9 may be off, thus recording nothing on film 1 as it passes the lamps; third, lamp 8 may be on, with lamp 9 off; and fourth, lamp 9 may be on, with lamp 8 off. In co-pending application, Serial No. 175,407 filed July 22, 1950, in the name of George Salamonovich, entitled "Function Generator," it is disclosed how these four conditions are utilized to rotate an electrical motor through each of the four quadrants of a circle. Thus, for each time the operator depresses key 23 a motor will ultimately be caused to rotate a quarter of a revolution. As disclosed in the co-pending application, this is accomplished by connecting the output of photoelectric cells excited by the recorded film strips to the windings of a synchro motor. In order to assure that the four different conditions listed above are printed on the film in the desired sequence, switches 14 and 15 and step motor 16 are provided. Step motor 16 is reversible and its direction of rotation is controlled by switch 17 shown in Fig. 3. Assuming for the moment that step motor 16 is connected so as to rotate in clockwise direction, it can be seen that the various contact points of switches 14 and 15 correspond to the hours on a clock face and that the connections to the contact points are staggered by the amount of one switch position. Since switches 14 and 15 are on a common shaft driven by step motor 16, and since step motor 16 drives the switches in "one-hour" steps, it can be seen that the required sequence of conditions obtains. For instance, when switches 14 and 15 are at one o'clock, as shown in Fig. 3, both lamps 8 and 9 are on. This condition corresponds to the record shown at I in Fig. 8. As step motor 16 advances one step, however, the switches advance to two o'clock where there is no contact to furnish electricity to lamp 8. Therefore, lamp 8 goes off, but lamp 9 remains on, since there is a contact potential at two o'clock on switch 15. This condition shows at II in Figs. 8, 9 and 10. The next step takes the switches to three o'clock, where neither lamp is lit. The following step takes the switches to four o'clock, where lamp 8 alone is on. The fourth step takes the switches to five o'clock, where both lamps are again in on condition.

It can thus be seen that by the cooperation of a circuit commencing with key 23 and ending with lamps 8 and 9 it is impossible for the operator to record the two channels corresponding to lamps 8 and 9 in the wrong sequence. It should be pointed out here that additional channels besides those corresponding to lamps 8 and 9 may be recorded on the film by the provision of additional step motors and switches, and that channel selector switches 8 and 9 are provided with additional contact points with this requirement in mind. Fig. 3, however, for the sake of simplicity, does not include these additional channels, since they would be but functional duplicates of the ones shown.

In case counters 35 and 36 do not indicate the desired number at the beginning of any recording operation, the number indicated thereby may be quickly changed by means of clutch and gear box 38 and lever 45. The purpose of these devices is to disconnect sprocket drive motor 37 from sprocket 3 and to connect motor 44 to counters 35 and 36 only. Motor 44 may directly drive counters 35 and 36 in order to obtain a quick resetting of the counter dials.

In order to adjust the speed at which motor 37 normally drives sprocket 3 and film 1, film speed control 46 is provided.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for recording on a continuous photographic film a pair of channels of transparent and opaque strips interpretable as a predetermined function of the film travel comprising two incandescent lamps, optical means for transmitting light from said lamps to said film, means for driving said film past said lamps at a uniform rate, counter means for indicating the position of said film, a tape upon which are recorded consecutive counter readings at which said lamps are required to be turned on and off in order that said strips may be interpretable as said predetermined function, means for focusing the image of said counter means upon said film, shutter means for allowing light from said counter means to reach said film only at predetermined uniform intervals of space along said film, window means positioned over said tape for presenting to the view of an operator only a short portion of said tape, a pair of ganged multiple-position switches, a step motor adapted to advance said ganged switches only one switch position at a time, electrical means for advancing said tape a predetermined short interval, and manually operable switch means for actuating said step motor and for advancing said tape when the reading of said counter equals the number presented to the view of the operator on said tape to thereby record a series of transparent and opaque strips interpretable as a predetermined function of the rate at which said film is driven.

2. Means for recording upon a continuous photographic film a pair of channels of alternately transparent and opaque strips in such a manner that the channels change from transparent to opaque or opaque to transparent in alternation along the film comprising an electrically controllable light system for casting light upon said film in two small areas, means for moving said film past said light system at a controllable rate, metering means for indicating to an operator the length of film which has passed said light system, tabulated data means for presenting singly to the operator successive values of said metering means at which said light system must be turned on or off in each channel to achieve the desired pattern of strips, a pair of ganged multiple-position switches connected to control each channel of said light system, a step motor for advancing said switches together one switch position at a time, and a push button switch connected to actuate said tabulated data means and step motor whereby the required pattern will be printed on said film and said tabulated data means will be advanced one value if the operator presses said push button when said metering means indicates a number which matches said tabulated data means.

3. In a film recording device means for sequencing predeterminately the exposure of two channels on the film, comprising optical systems for casting light on two parallel channels on said film, two multiple-position rotary switches ganged together and connected to turn each said optical system on and off at predetermined switch positions such that as said switches are rotated successively from position to position said optical systems are turned on and off in the same sequence, and manually operable step motor means for advancing said switches a step at a time to thereby obtain a predetermined sequence of exposure in said two channels.

4. In a film recording device for exposing simultaneously two coordinated channels of information on a film, means for coordinating the exposure of the film in said channels according to a predetermined repetitive sequence comprising two light systems for casting light on each of two parallel channels of said film, motive means for moving said film past said light systems at a predetermined rate, a counter visible to an operator drivable by said motive means for indicating the amount of film passing said light systems, an optical system for periodically focusing the image of said counter means on said film, a tape upon which are recorded predetermined successive values of said counter reading at which one of said light systems must be turned on or off in order to achieve a predetermined relation between the travel of said film and the exposure thereof, drive means for advancing said tape by one said recorded value, two ganged multiple-position switches each connected to turn each said light system on or off at predetermined switch positions such that as said switches are rotated successively from switch position to switch position said light systems are turned on and off in the same repetitive sequence, a step motor connected to rotate said multiple-position switches one position per step, a single switch closable by an operator when said counter reading equals each value recorded on said tape, and two relays energized by said single switch and controlling said step motor and said tape advancing means whereby said film is exposed in said two channels in predetermined relation to the travel of said film in coordinated predetermined sequence.

5. Means for producing on a continuous film two rows of alternately exposed and unexposed strips of predeterminately variable length and with an invariant repetitive sequence comprising controllable means for casting light on points spaced transversely of said film, motive means for moving said film past said points at a predetermined rate, counter means visible to an operator for indicating the amount of film which passes said points, tabulated data means for indicating values of said counter readings at which said light means must be turned on and off to achieve said predetermined strip lengths, and manually operable electrical means for turning said light means on and off in sequence when the reading of said counter means equals successive values shown by said tabulated data means to thereby obtain two rows of alternately exposed and unexposed strips of predeterminately variable length and with invariant repetitive sequence on said film.

6. A device as recited in claim 5 in which said manually operable electrical means comprises two ganged rotary multiple position switches each connected to one of said light means through every other pair of switch positions, said switches being staggered by one switch position, a step motor for advancing said switches one position at a time, a relay for energizing said step motor, means for presenting to the view of the operator successive values of said tabulated data, a single manually operable switch for simultaneously energizing said relay and advancing said tabulated data selecting means by one value when the reading of said counter means equals said tabulated data value.

7. Means for photographically exposing two rows of predeterminately spaced coordinated sequenced strips of predetermined lengths on a strip of film comprising controllable means for casting light on two points spaced transversely on said film, motive means for moving said film past said points at a constant rate, counter means visible to an operator for indicating the amount of film which passes said points, tabulated data means indicative of values of said counter readings at which said light means must be controlled to achieve said predetermined strip lengths, two ganged rotary multiple position switches each connected to supply energy to said light means through every other pair of switch positions, said switches being staggered by one switch position, a step motor for advancing said switches one position at a time, a relay for supplying energy to said step motor, means for presenting to the view of the operator successive single values of said tabulated data, and a single manually operable switch for simultaneously energizing said relay and advancing said tabulated data selecting means by one value when the reading of said counter means equals said tabulated data value to thereby expose two rows of predeterminately spaced coordinated sequenced strips of predetermined lengths on said strip of film.

AVARD F. FAIRBANKS.

No references cited.